(12) United States Patent
Hirono et al.

(10) Patent No.: US 10,706,246 B2
(45) Date of Patent: Jul. 7, 2020

(54) OPTICAL INFORMATION READING APPARATUS AND OPTICAL INFORMATION READING METHOD

(71) Applicant: OPTOELECTRONICS CO., LTD., Saitama (JP)

(72) Inventors: Mitsuaki Hirono, Saitama (JP); Satoshi Kawasaki, Saitama (JP); Masaki Kurokawa, Saitama (JP)

(73) Assignee: OPTOELECTRONICS CO., LTD., Saitama (JP)

( * ) Notice: Subject to any disclaimer, the term of this patent is extended or adjusted under 35 U.S.C. 154(b) by 0 days.

(21) Appl. No.: 16/293,918

(22) Filed: Mar. 6, 2019

(65) Prior Publication Data
US 2019/0347455 A1    Nov. 14, 2019

(30) Foreign Application Priority Data

May 11, 2018 (JP) .................. 2018-092385

(51) Int. Cl.
*G06K 7/10* (2006.01)
*G06K 7/14* (2006.01)
(52) U.S. Cl.
CPC ....... *G06K 7/10722* (2013.01); *G06K 7/1413* (2013.01); *G06K 7/1417* (2013.01)
(58) Field of Classification Search
CPC ................................................. G06K 7/10722
USPC .................. 235/462.11, 454, 462.01, 462.25
See application file for complete search history.

(56) References Cited

U.S. PATENT DOCUMENTS

| 4,566,032 A | 1/1986 | Hirooka et al. |
| 5,959,282 A | 9/1999 | Tabuchi |
| 6,474,555 B1 | 11/2002 | Tsunobuchi et al. |
| 2004/0026508 A1 | 2/2004 | Nakajima et al. |
| 2004/0046024 A1* | 3/2004 | Natsukari ............. G06K 1/121 235/454 |
| 2006/0097054 A1* | 5/2006 | Biss ...................... G06K 7/089 235/462.45 |

FOREIGN PATENT DOCUMENTS

| DE | 10002353 A1 | 10/2000 |
| JP | 59-112312 A | 6/1984 |
| JP | 2004-054645 A | 2/2004 |

OTHER PUBLICATIONS

Extended European Search Report for EP19160729.0 dated Sep. 9, 2019, 8 pages.
Notice of the Reasons for Rejection dated Apr. 21, 2020.

* cited by examiner

*Primary Examiner* — Allyson N Trail
(74) *Attorney, Agent, or Firm* — Brundidge & Stanger, P.C.

(57) ABSTRACT

An optical code reading process and a reading stability determining process are performed while suppressing an increase in the cost of a transfer system and avoiding a decrease in work efficiency. CCD performs imaging. Processor reads a one-dimensional code contained in image data taken by CCD, and outputs a signal when a reading process in which the number of reading successes related to the one-dimensional code reaches a determination reference value is completed. In addition, processor determines reading stability during a period from the first reading success to completion of the reading process and outputs predictive maintenance information (PMI) representing a determination result of reading stability.

7 Claims, 9 Drawing Sheets

OPTICAL INFORMATION READING APPARATUS AND OPTICAL INFORMATION READING METHOD

CROSS REFERENCE TO RELATED APPLICATIONS

This application is entitled to and claims the benefit of Japanese Patent Application No. 2018-092385, filed on May 11, 2018, the disclosure of which including the specification, drawings and abstract is incorporated herein by reference in its entirety.

TECHNICAL FIELD

The present invention relates to an optical information reading apparatus and an optical information reading method that perform an optical code reading process and a stability determination process.

BACKGROUND ART

Today, in a wide range of fields of product management, position detection, and the like, one-dimensional codes, two-dimensional codes, and other optical codes written with information expressed by symbols having reflectance different from that of the periphery are used. The one-dimensional code, which is also referred to as bar code, linear code, or the like, can express information, such as alphanumeric characters, for example, a universal product code through its bars and spaces made using striations with different widths linearly arranged adjacent to each other. The two-dimensional code, which is also referred to as two-dimensional symbol or the like, is a symbol in which information are arranged vertically and horizontally so that high information density is achieved, thereby storing a larger amount of information than the one-dimensional code. Note that the QR code (registered trademark) is a type of two-dimensional code.

To read optical codes, such as one-dimensional codes or two-dimensional codes, a code scanner or other optical information reading apparatuses is used. Optical information reading apparatuses are widely used in different fields. For example, an optical information reading apparatus is attached to a movable body which is called a vehicle in a transfer system. In this case, the optical information reading apparatus moves with the vehicle and reads an optical code attached to a predetermined position (station), and upon success of reading, outputs code information to the processor of the vehicle. The code information acts as a trigger for vehicle's deceleration or stop.

In use of the optical information reading apparatus, the stability of reading the optical code decreases due to contamination on the code label, print quality deterioration, contamination on the reading window of the optical information reading apparatus, or the like. Conventionally, a process is performed for measuring reading stability and outputting predictive maintenance information (PMI) indicating reading stability (see PTL 1).

Since the optical information reading apparatus notifies the user of the fact that the reading stability is decreasing at the stage where the optical code is readable, the user can take a necessary countermeasure before the optical information reading apparatus can no longer read the optical code, thereby avoiding the situation where the optical code unintentionally becomes unreadable.

CITATION LIST

Patent Literature

PTL 1
Japanese Patent Application Laid-Open No. 2004-54645

SUMMARY OF INVENTION

Technical Problem

However, a conventional transfer system requires a dedicated movable body for measuring reading stability, which increases the cost. Besides, during measurement of reading stability, a typical vehicle must be stopped, which decreases work efficiency.

The present invention, which has been made in view of this, provides an optical information reading apparatus and an optical information reading method in which an optical code reading process and a reading stability determining process can be performed while suppressing an increase in the cost of the transfer system and avoiding a decrease in work efficiency.

Solution to Problem

An optical information reading apparatus according to the present invention is an optical information reading apparatus to be attached to a movable body that moves parallel to a height direction of a one-dimensional code, the optical information reading apparatus being configured to repeatedly attempt to read the one-dimensional code along movement of the movable body, the optical information reading apparatus including: an imaging section that performs imaging; and a control section that reads a one-dimensional code contained in image data taken by the imaging section, and outputs a signal upon completion of a reading process in which the number of reading successes related to the one-dimensional code reaches a determination reference value, in which the control section determines reading stability during a period from the first reading success to the completion of the reading process and outputs predictive maintenance information (PMI) representing a determination result of the reading stability.

An optical information reading method according to the present invention is an optical information reading method for an optical information reading apparatus that is to be attached to a movable body moving parallel to a height direction of a one-dimensional code, the optical information reading method including: performing imaging in an imaging section; reading a one-dimensional code contained in image data taken by the imaging section; outputting a signal upon completion of a reading process in which the number of reading successes related to the one-dimensional code reaches a determination reference value; determining reading stability during a period from the first reading success to the completion of the reading process; and outputting predictive maintenance information (PMI) representing a determination result of the reading stability.

Advantageous Effects of Invention

According to the present invention, an optical code reading process and a reading stability determining process can be performed while suppressing an increase in the cost of the transfer system and avoiding a decrease in work efficiency.

DESCRIPTION OF EMBODIMENTS

Figure 1:
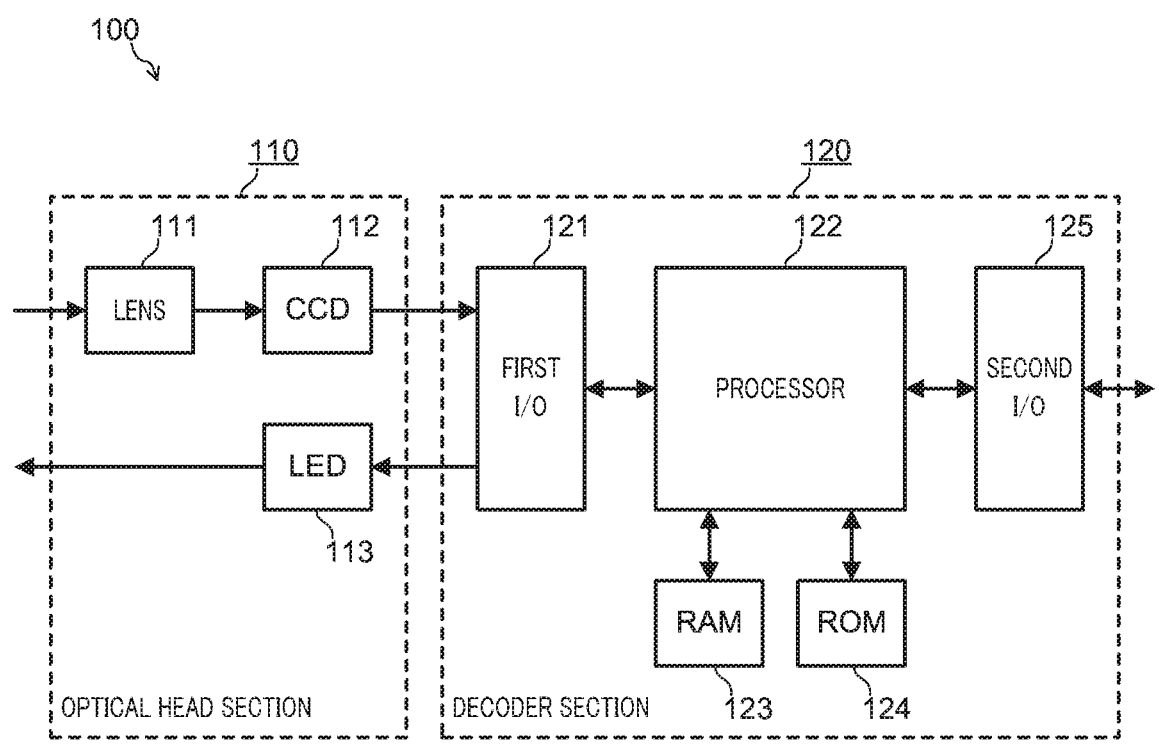
FIG. 1 is a diagram showing a schematic hardware configuration of a code scanner according to Embodiment 1 of the present invention.

Embodiments of the present invention will be described in detail below with reference to the drawings. Note that in each embodiment, a code scanner is used as one example of an optical information reading apparatus. In addition, in each embodiment, a code scanner is attached to a vehicle (not shown in the drawings) that runs along a path on the ceiling or the like of a factory to carry parts and the like, and is used to read an optical code attached to a predetermined position. A vehicle may be referred to as "shuttle", "car carriage", "travel cart", "movable body", or the like. Note that the vehicle is wirelessly connected to a host computer (not shown in the drawings) that controls the transfer system.

Embodiment 1

In Embodiment 1, code scanner 100 performs a process for reading a one-dimensional code and a reading stability determining process.

<Configuration of Code Scanner>

First, the schematic hardware configuration of code scanner 100 of Embodiment 1 will be described with reference to FIG. 1. Code scanner 100 consists of optical head section 110 and decoder section 120.

Optical head section 110 includes lens 111 and charge coupled device (CCD) image sensor (hereinafter simply referred to as "CCD") 112 which is one example of solid-state image sensing device. Optical head section 110 may further include light emitting diode (LED) 113 which is one example of light source.

Lens 111 is, for example, an optical lens which takes an image of an object to be read including an optical code into optical head section 110, and forms an image on the imaging area of CCD 112.

CCD 112 images the object to be read from light reflected off the object to be read taken by the lens 111, generates image data, which is expressed by a digital brightness, from the analog image signal obtained by imaging, and outputs it to decoder section 120.

LED 113 emits light to illuminate the object to be read. Hence, the CCD 112 can pick up a clear image.

Decoder section 120 includes first input/output interface (first I/O) 121, processor 122, random access memory (RAM) 123, read only memory (ROM) 124, and second input/output interface (second I/O) 125.

First I/O 121 is an interface for data communication between optical head section 110 and decoder section 120 and image data output from CCD 112 is input to processor 122 through first I/O 121.

Processor 122 controls CCD 112 and LED 113 and performs a filtering process for removing noise in image data input from CCD 112 through first I/O 121, a data processing process for preparation of decoding, a process for decoding an optical code contained in the processed image data, and the like. To be specific, the decoding process may use means described in Japanese Patent Application Laid-Open No. 2005-25417, for example, or other known arbitrary means.

Further, processor 122 determines reading stability. Subsequently, processor 122 outputs code information, which is the optical code reading result, and PMI, which represents the reading stability determination result, to the processor of the vehicle through second I/O 125.

RAM 123 is a storage means that temporarily stores image data input from CCD 112, is used as a work memory during a data processing process for preparation for decoding, and stores other data needed for the operation of code scanner 100 or other data that dynamically changes. Note that a part of RAM 123 may be nonvolatile.

ROM 124 is a nonvolatile storage means that stores, for example, a program for actuating code scanner 100.

Second I/O 125 is an interface for data communication between processor 122 and the processor of the vehicle, and decoded data information output from processor 122 is input to the processor of the vehicle through second I/O 125.

<Process Flow in Code Scanner>

The flow of a process in processor 122 in code scanner 100 of Embodiment 1 will be described with reference to FIG. 2. Note that in Embodiment 1, in the initial state, for RAM 123, the number of reading trials m, the number of reading successes k, and the number of reading failures E are set to "0". In addition, for RAM 123, reference value K for determination of reading success is set in advance.

Processor 122 is standby until the trigger signal is turned on or a reading start request is input (ST 101: NO). When the trigger signal is turned on or the reading start request is input (ST 101: YES), processor 122 turns on LED 113 (ST 102) and a one-dimensional code contained in image data input from CCD 112 is read (ST 103). This one-dimensional code reading is continued until determination reference value K is attained, the trigger signal is turned off, or a reading stop request is input.

Subsequently, processor 122 binarizes the intensity of reflected light from the one-dimensional code, and decodes the binarized data and converts it to code information of several digits, thereby decrypting code information (ST 104).

Processor 122 determines whether or not code information has been decrypted (ST 105). When code information has been decrypted (ST 105: YES), processor 122 increments the number of reading trials m by "1" (ST 106).

When the number of reading trials m is "1", that is, upon the first reading success (ST 107: YES), the flow proceeds to ST 109. Note that, at this time, processor 122 causes RAM 123 to store decrypted code information.

When m is two or more (ST 107: NO), processor 122 compares code information stored in RAM 123 (hereinafter referred to as "stored code information") with code information decrypted this time (hereinafter referred to as "decrypted code information") (ST 108). When the decrypted code information matches the stored code information (ST 108: YES), processor 122 increments the number of reading successes k by "1" (ST 109). In contrast, when the decrypted code information does not match the stored code information (ST 108: NO), the flow proceeds to ST 118. At this time, the processor 122 returns the number of reading successes k to "0", and makes the decrypted code information overwritten by the stored code information which is then stored in RAM 123.

After ST 109, processor 122 determines whether the number of reading successes k has reached determination reference value K (ST 110). When the number of reading successes k has reached determination reference value K (ST 110: YES), processor 122 outputs a completion notification signal indicating the completion of the reading process to the processor of the vehicle (ST 111), and turns off LED 113 (ST 112).

After ST 112, processor 122 determines reading stability (ST 113), outputs predetermined data (code information, PMI, and the like) to the processor of the vehicle (ST 114), and terminates the process. The processor of the vehicle recognizes the position of the vehicle based on the code information, and controls the vehicle so that it decelerates, for example. In addition, code information and PMI are transferred from the vehicle to the host computer and are shown on the display of the host computer. Note that the details of the reading stability determining process will be described later.

When code information has not been successfully decrypted upon the above-described determination in ST 105 (ST 105: NO), processor 122 checks the number of reading trials m (ST 115). When the number of reading trials m is other than "0" (ST 115: YES), processor 122 increments the number of reading trials m by "1" (ST 116). The flow proceeds to ST 117. In contrast, when the number of reading trials m is "0" (ST 115: NO), that is, when a success of reading of one-dimensional code has never been achieved, the flow proceeds to ST 118.

After ST 108: NO and ST 116, processor 122 increments the number of reading failures E by "1" (ST 117). After ST 117, the flow proceeds to ST 118.

Upon the above-described determination in ST 110, even when the number of reading successes k is smaller than determination reference value K (ST 110: NO), the flow proceeds to ST 118.

In ST 118, when the trigger signal is not off and no reading stop request is input (ST 118: NO), the flow returns to ST 103 (reading of the one-dimensional code). In contrast, when the trigger signal has been turned off or a reading stop request has been input (ST 118: YES), processor 122 outputs an abnormality notification signal indicating the fact that a process for reading the one-dimensional code has not been completed, that is, the occurrence of an abnormality to the processor of the vehicle (ST 119), turns off LED 113 (ST 120), and terminates the process. Upon reception of the abnormality notification signal, the processor of the vehicle controls the vehicle to bring it to an emergency stop, for example.

Note that upon completion of the process, processor 122 sets the number of reading trials m, the number of reading successes k, and the number of reading failures E to "0".

<Reading Stability Determining Process>

Next, the details of the reading stability determining process of Embodiment 1 (ST 113 in FIG. 2) will be described with reference to FIG. 3. Note that in Embodiment 1, for RAM 123, caution threshold L1 and warning threshold L2 (L1<L2) are set in advance.

First, processor 122 calculates, as an index representing reading stability, a failure rate (E/m) which is the ratio of the number of reading failures E to the number of reading trials m from the first reading success (ST 151).

Next, processor 122 compares the failure rate with caution threshold L1 and warning threshold L2 (ST 152 and ST 154).

When the failure rate is less than or equal to caution threshold L1 (ST 152: YES), processor 122 determines that the reading stability is at a normal level and sets the simplified character of PMI to "A" (ST 153). In contrast, when the failure rate is greater than caution threshold L1 (ST 152: NO) and less than or equal to warning threshold L2 (ST 154: YES), processor 122 determines that the reading stability is at a caution level and sets the simplified character of PMI to "B" (ST 155). When the failure rate is greater than warning threshold L2 (ST 154: NO), processor 122 determines that the reading stability is at a warning level and sets the simplified character of PMI to "C" (ST 156).

Figure 2:
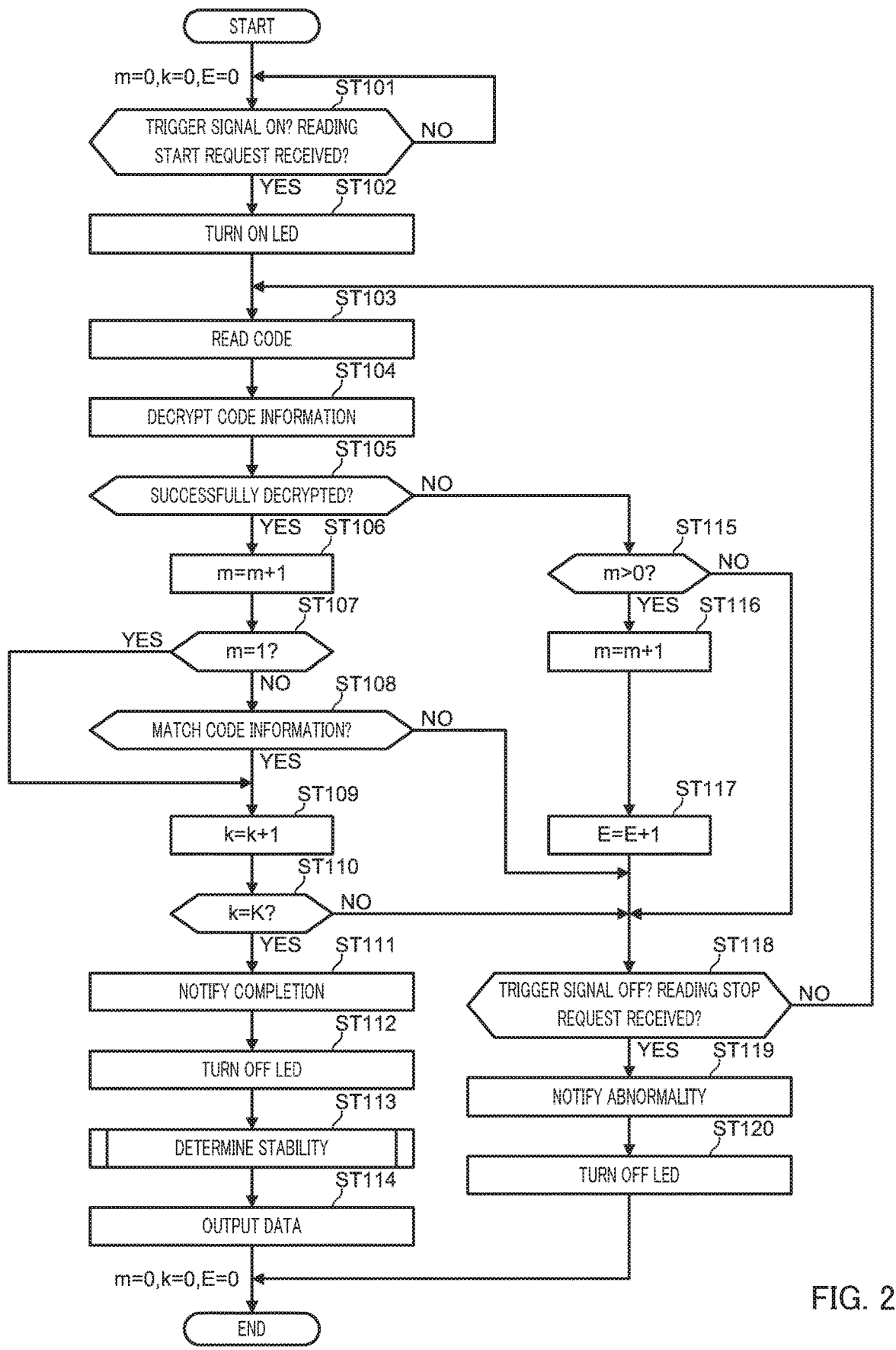
FIG. 2 is a flow diagram showing the flow of a process in a processor in the code scanner according to Embodiment 1 of the present invention.
Figure 3:
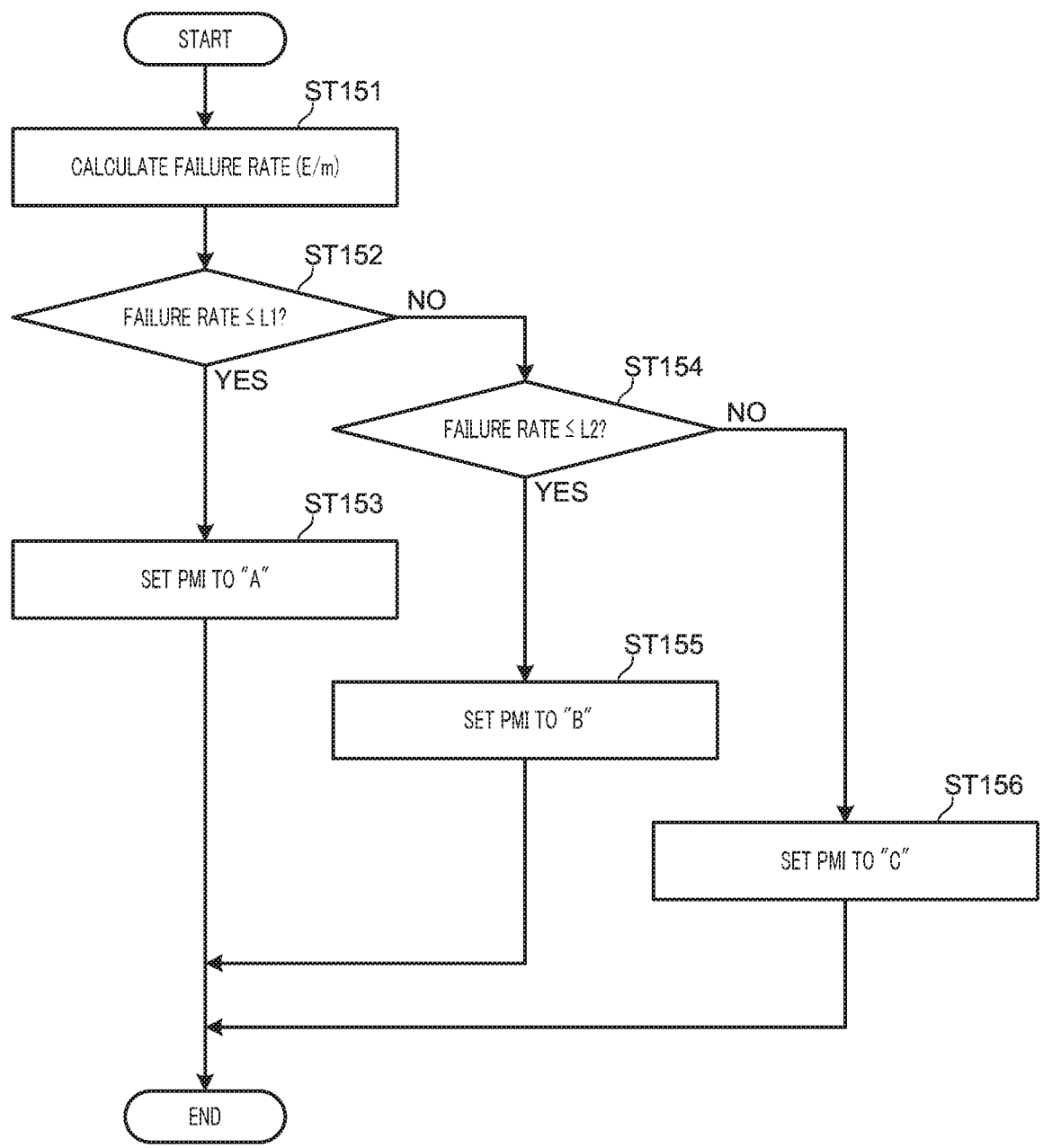
FIG. 3 is a flow diagram showing the flow of a reading stability determining process in the code scanner according to Embodiment 1 of the present invention.

After determination related to reading stability, in ST 114 in FIG. 2, processor 122 outputs code information, which is a reading result related to one-dimensional code, and PMI, which is a determination result related to reading stability, to the processor of the vehicle.

Although the above description has been made assuming that PMI is a simplified character, this is not necessarily the case in Embodiment 1: for example, a failure rate (E/m) may be used as PMI. In this case, the necessity of the above-described process from ST 152 to ST 156 in FIG. 3 is eliminated.

<Example Process in Code Scanner>

An example process in code scanner 100 according to Embodiment 1 will be described with reference to FIG. 4. Note that in this example, determination reference value K is set to "10", caution threshold L1 is set to "0.2", and warning threshold L2 is set to "0.5".

Figure 4:
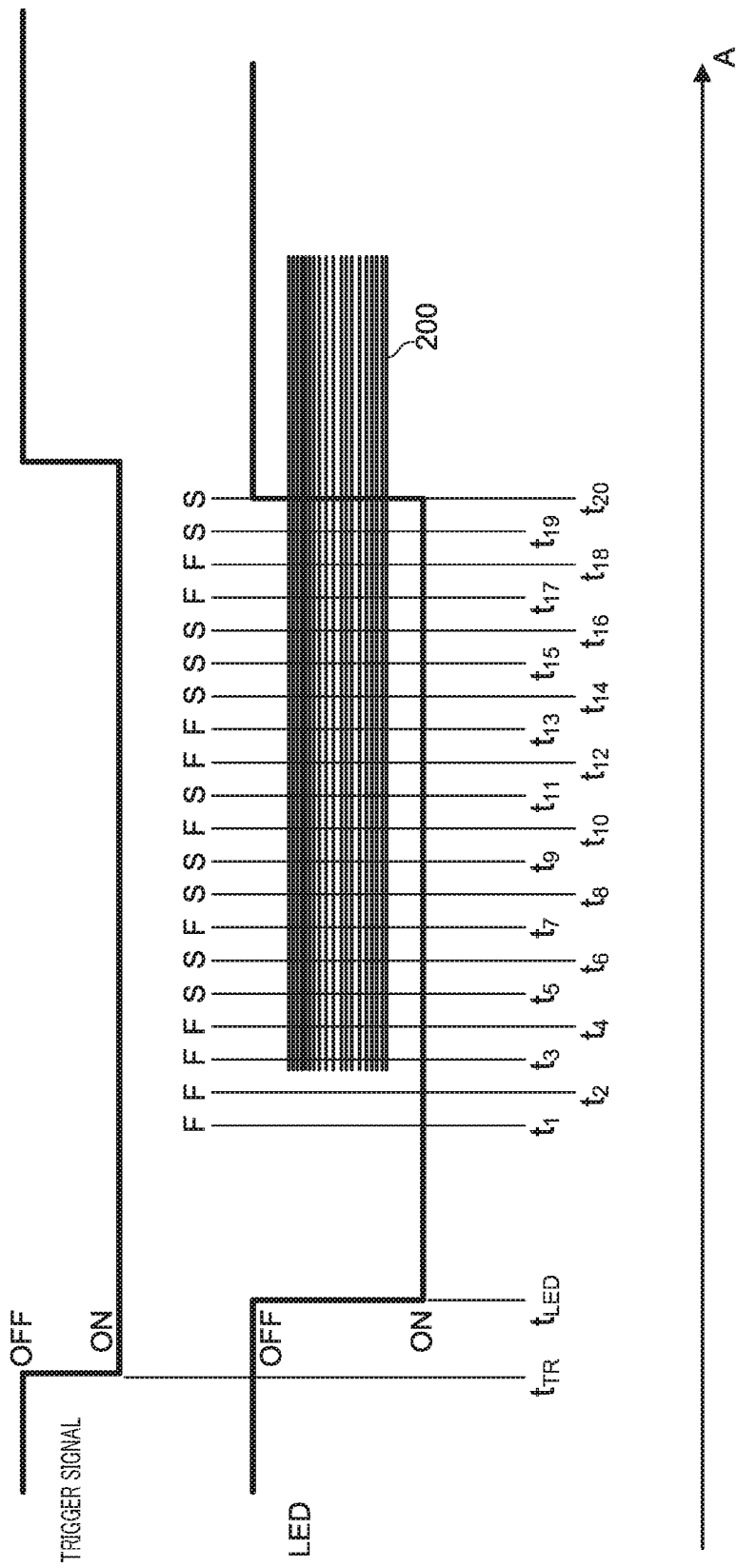
FIG. 4 is a diagram for explaining a concrete example of a process in the code scanner according to Embodiment 1 of the present invention.

Code scanner 100 attached to the vehicle moves along the movement of the vehicle in a direction generally parallel with the height direction of one-dimensional code 200 (the direction of A in FIG. 4).

Referring to FIG. 4, suppose that the trigger signal is turned on at time $t_{TR}$. Subsequently, code scanner 100 turns on LED 113 at time $t_{LED}$.

Subsequently, at time $t_i$ (i is an integer of one or more), code scanner 100 repeats to attempt a process for reading one-dimensional code 200 (including decoding of binarized data, decryption of code information, and matching determination of code information), and determines a success or failure of reading one-dimensional code 200 each time. Note that a failure of reading include both a failure of decryption of code information of one-dimensional code 200 and a mismatch between decrypted code information and stored code information. In FIG. 4, a success of reading is represented by "S", and a failure is represented by "F".

Referring to FIG. 4, suppose that code scanner 100 first succeeds in reading at time $t_5$. In other words, time $t_5$ matches the time of the first reading success.

Suppose also that at time $t_{20}$, the number of reading successes k reaches determination reference value K (=10). In this case, at time $t_{20}$, code scanner 100 outputs a completion notification signal to the processor of the vehicle.

In addition, at time $t_{20}$, code scanner 100 starts a reading stability determining process. In the case of FIG. 4, from time $t_5$ to time $t_{20}$, 16 reading processes (scans) are attempted (m=16), resulting in 10 reading successes (k=10) and 6 reading failures (E=6). Accordingly, the failure rate (E/m) is "0.375".

This failure rate is greater than caution threshold L1 and less than or equal to warning threshold L2. Accordingly, in the case of FIG. 4, code scanner 100 determines that the reading stability is at a caution level and outputs "B" as PMI.

Effects

As described above, in Embodiment 1, code scanner 100 determines reading stability based on the ratio of the number of reading successes or the number of reading failures to the number of reading processes attempted during a period from the first reading success to the completion of the reading process. Thus, with one code scanner 100 attached to the vehicle, a process for reading one-dimensional code can be performed and a reading stability determining process can be performed for the one-dimensional code part used in the reading process. Hence, an optical code reading process and a reading stability determining process can be performed while suppressing an increase in the cost of the transfer system and avoiding a decrease in work efficiency.

Embodiment 2

In Embodiment 2, description will be made as to the case where, as in Embodiment 1, code scanner 100 performs a process for reading a one-dimensional code and a reading stability determining process. However, in Embodiment 2, the contents of the reading stability determining process are different from that described in Embodiment 1. Note that the configuration of code scanner 100 in Embodiment 2 is the same as that shown in FIG. 1 described in relation to Embodiment 1 and its description will therefore be omitted.

<Process Flow in Code Scanner>

Figure 5:
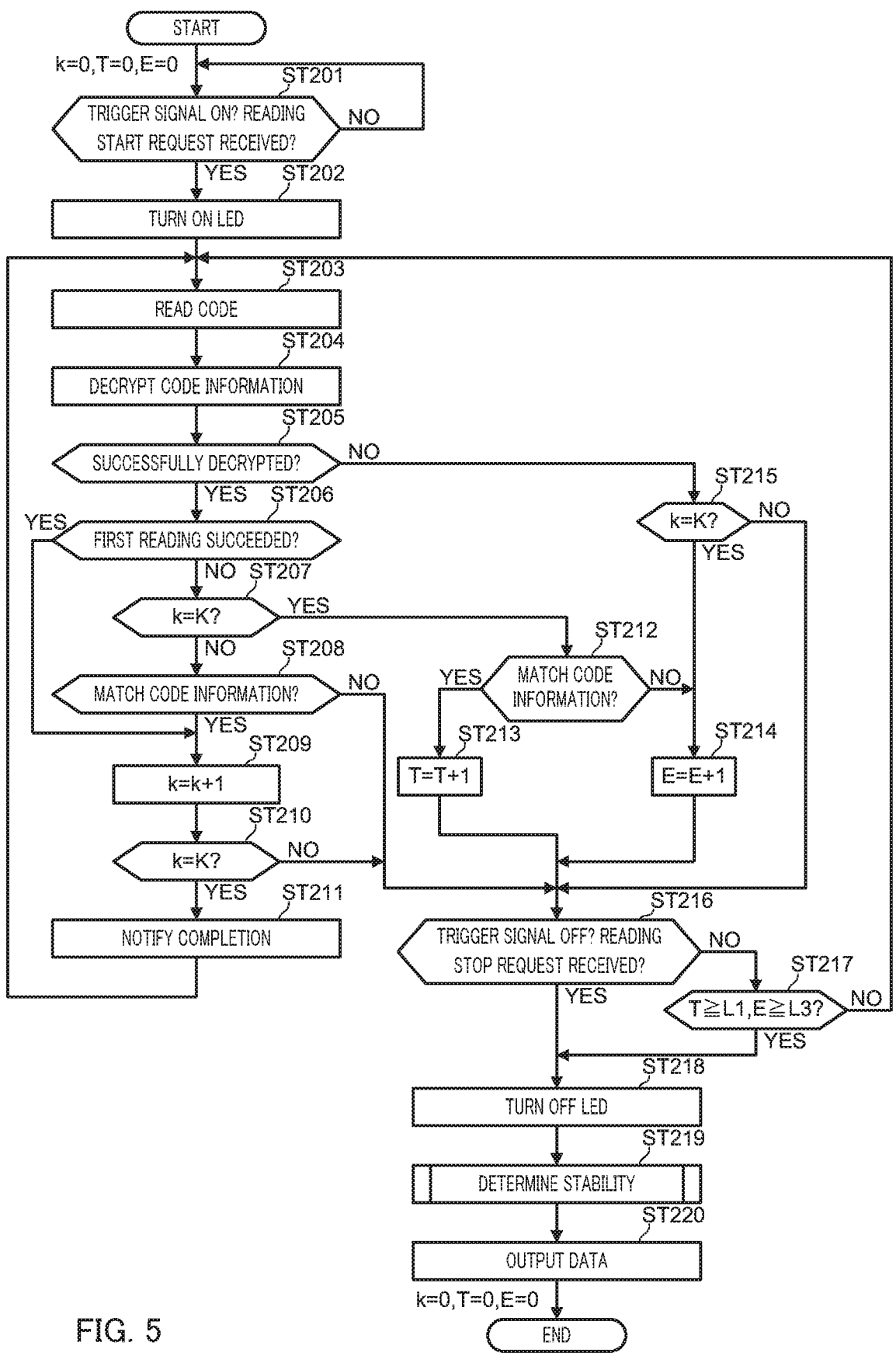
FIG. 5 is a flow diagram showing the flow of a process in a processor in the code scanner according to Embodiment 2 of the present invention.

The flow of a process in processor 122 in code scanner 100 of Embodiment 2 will be described with reference to FIG. 5. Note that in Embodiment 2, in the initial state, the first number of reading successes k, the second number of reading successes T, and the number of reading failures E are set to "0" for RAM 123. In addition, for RAM 123, reference value K for determination of reading success, caution threshold L1, and failure upper limit L3 are set in advance. In addition, ST 201 to ST 205 shown in FIG. 5 are the same as ST 101 to ST 105 shown in FIG. 2 and their description will therefore be omitted.

In the case where code information has been successfully decrypted in ST 205 (ST 205: YES), when a reading success is first achieved (upon the first reading success) (ST 206: YES), the flow proceeds to ST 209 in processor 122. Note that, at this time, processor 122 causes RAM 123 to store decrypted code information.

Upon the second or later reading success (ST 206: NO) and when the first number of reading successes k is less than determination reference value K (ST 207: NO), processor 122 compares decrypted code information with stored code information (ST 208). When the decrypted code information matches the stored code information (ST 208: YES), processor 122 increments the first number of reading successes k by "1" (ST 209). In contrast, when the decrypted code information does not match the stored code information (ST 208: NO), the flow proceeds to ST 216. At this time, the processor 122 returns the number of reading successes k to "0", and makes the decrypted code information overwritten by the stored code information which is then stored in RAM 123.

After ST 209, processor 122 determines whether or not the first number of reading successes k has reached determination reference value K (ST 210). When the first number of reading successes k has reached determination reference value K (ST 210: YES), processor 122 outputs a completion notification signal indicating the completion of the reading process to the processor of the vehicle (ST 211). Afterwards, the flow returns to ST 203 (reading of the one-dimensional code). In contrast, when the first number of reading successes k is smaller than determination reference value K (ST 210: NO), the flow proceeds to ST 216.

In the case where the first number of reading successes k has reached determination reference value K in the above-described ST 207 (ST 207: YES), that is upon completion of the process for reading the one-dimensional code, processor 122 starts measurement for determination of reading stability. First, processor 122 compares decrypted code information with stored code information (ST 212).

When the decrypted code information matches the stored code information (ST 212: YES), processor 122 increments the second number of reading successes T by "1" (ST 213). After ST 213, the flow proceeds to ST 216. In contrast, when the decrypted code information does not match the stored code information (ST 212: NO), processor 122 increments the number of reading failures E by "1" (ST 214). After ST 214, the flow proceeds to ST 216.

In the case where the above-described determination in ST 205 determines that code information has not been decrypted (ST 205: NO), if the first number of reading successes k has reached determination reference value K (ST 215: YES), processor 122 increments the number of reading failures E by "1" (ST 214). In contrast, when the first number of reading successes k is smaller than determination reference value K (ST 215: NO), the flow proceeds to ST 216.

In ST 216, in the case where the trigger signal is not off and the reading stop request is not input (ST 216: NO), when the second number of reading successes T is less than caution threshold L1 and the number of reading failures E is less than failure upper limit L3 (ST 217: NO), the flow returns to ST 203 (reading of the one-dimensional code).

In contrast, when the trigger signal has been turned off or the reading stop request has been input (ST 216: YES), or when the second number of reading successes T is greater than or equal to caution threshold L1 or the number of reading failures E is greater than or equal to failure upper limit L3 (ST 217: YES), processor 122 turns off the LED (ST 218), makes determination related to reading stability (ST 219), outputs predetermined data (code information, PMI, and the like) to the processor of the vehicle (ST 220), and terminates the process. The processor of the vehicle recognizes the position of the vehicle based on the code information, and controls the vehicle so that it decelerates, for example. In addition, code information and PMI are transferred from the vehicle to the host computer and are shown on the display of the host computer. Note that the details of the reading stability determining process will be described later.

Note that upon completion of the process, processor 122 sets the first number of reading successes k, the second number of reading successes T, and the number of reading failures E to "0".

<Reading Stability Determining Process>

Figure 6:
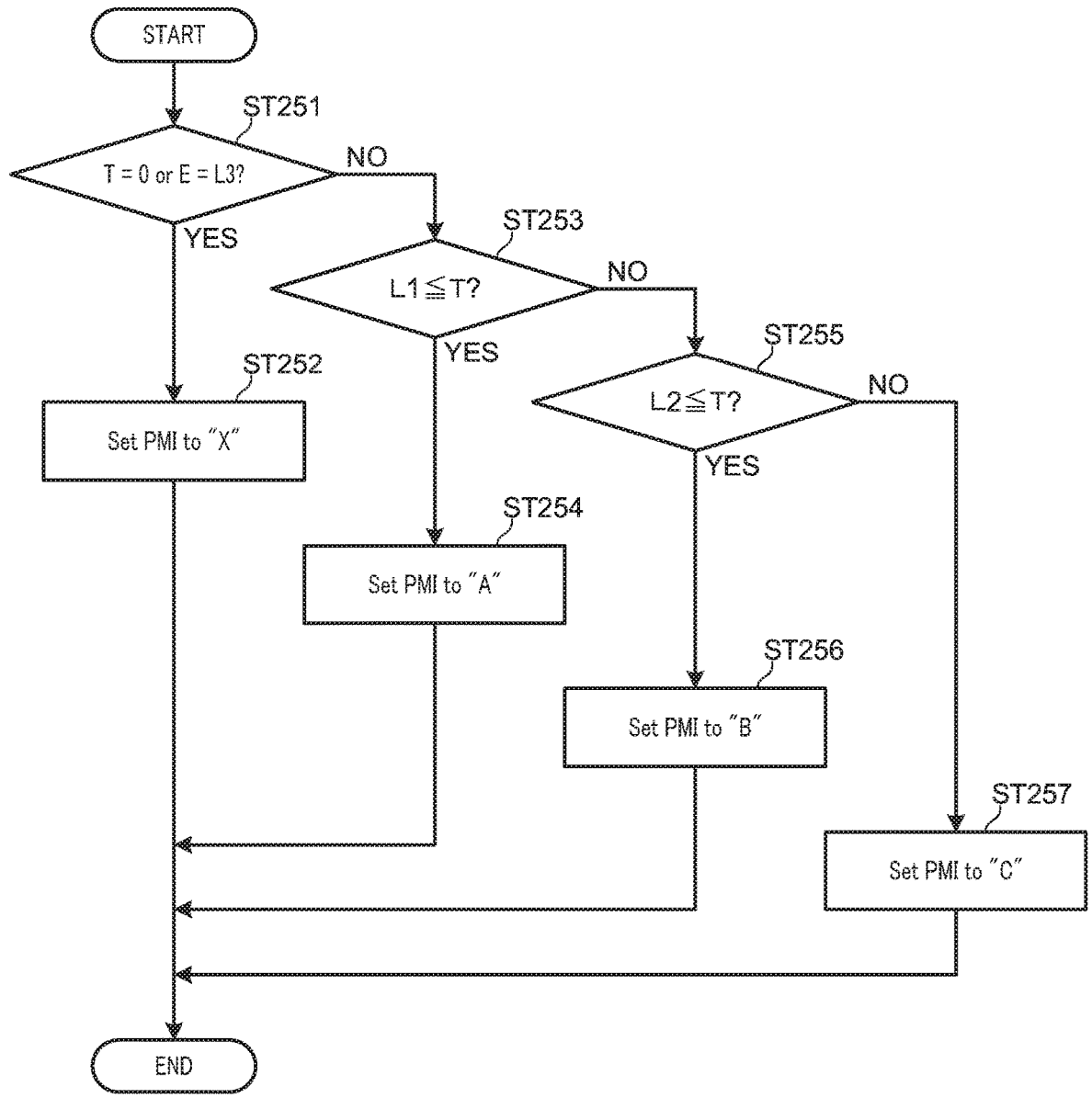
FIG. 6 is a flow diagram showing the flow of a reading stability determining process in the code scanner according to Embodiment 2 of the present invention.

Next, the details of the reading stability determining process of Embodiment 2 (ST 219 in FIG. 5) will be described with reference to FIG. 6. Note that in Embodiment 2, for RAM 123, in addition to caution threshold L1 and failure upper limit L3, warning threshold L2 (L1<L2) is set in advance.

When the second number of reading successes T is "0" or the number of reading failures E has reached failure upper limit L3 (ST 251: YES), processor 122 determines that a reading error has occurred and sets the simplified character of PMI to "X" (ST 252).

When the second number of reading successes T is "1" or more and the number of reading failures E is less than failure upper limit L3 (ST 251: NO), processor 122 compares the second number of reading successes T with caution threshold L1 and warning threshold L2 (ST 253 and ST 255).

When the second number of reading successes T is greater than or equal to caution threshold L1 (ST 253: YES), processor 122 determines that the reading stability is at a normal level and sets the simplified character of PMI to "A" (ST 254). In contrast, when the second number of reading successes T is less than caution threshold L1 (ST 253: NO) and greater than or equal to warning threshold L2 (ST 255: YES), processor 122 determines that the reading stability is at a caution level and sets the simplified character of PMI to "B" (ST 256). When the second number of reading successes T is smaller than warning threshold L2 (ST 255: NO), processor 122 determines that the reading stability is at a warning level and sets the simplified character of PMI to "C" (ST 257).

After determination related to reading stability, in ST 220 in FIG. 5, processor 122 outputs code information and PMI to the processor of the vehicle.

Effects

As described above, in Embodiment 2, code scanner 100 determines reading stability based on the ratio of the number of reading successes or the number of reading failures to the number of reading processes attempted during a predetermined period after the completion of the reading process. Thus, with one code scanner 100 attached to the vehicle, a process for reading one-dimensional code can be performed and a reading stability determining process can be performed for a part following the one-dimensional code part used in the reading process. Hence, an optical code reading process and a reading stability determining process can be performed while suppressing an increase in the cost of the transfer system and avoiding a decrease in work efficiency.

Embodiment 3

In Embodiment 3, as in Embodiment 1, code scanner 100 performs a process for reading a one-dimensional code and a reading stability determining process. Note that in Embodiment 3, the contents of the reading stability determining process are different from that described in Embodiment 1. Note that the configuration of code scanner 100 in Embodiment 3 is the same as that shown in FIG. 1 described in relation to Embodiment 1 and its description will therefore be omitted.

<Process Flow in Code Scanner>

Figure 7:
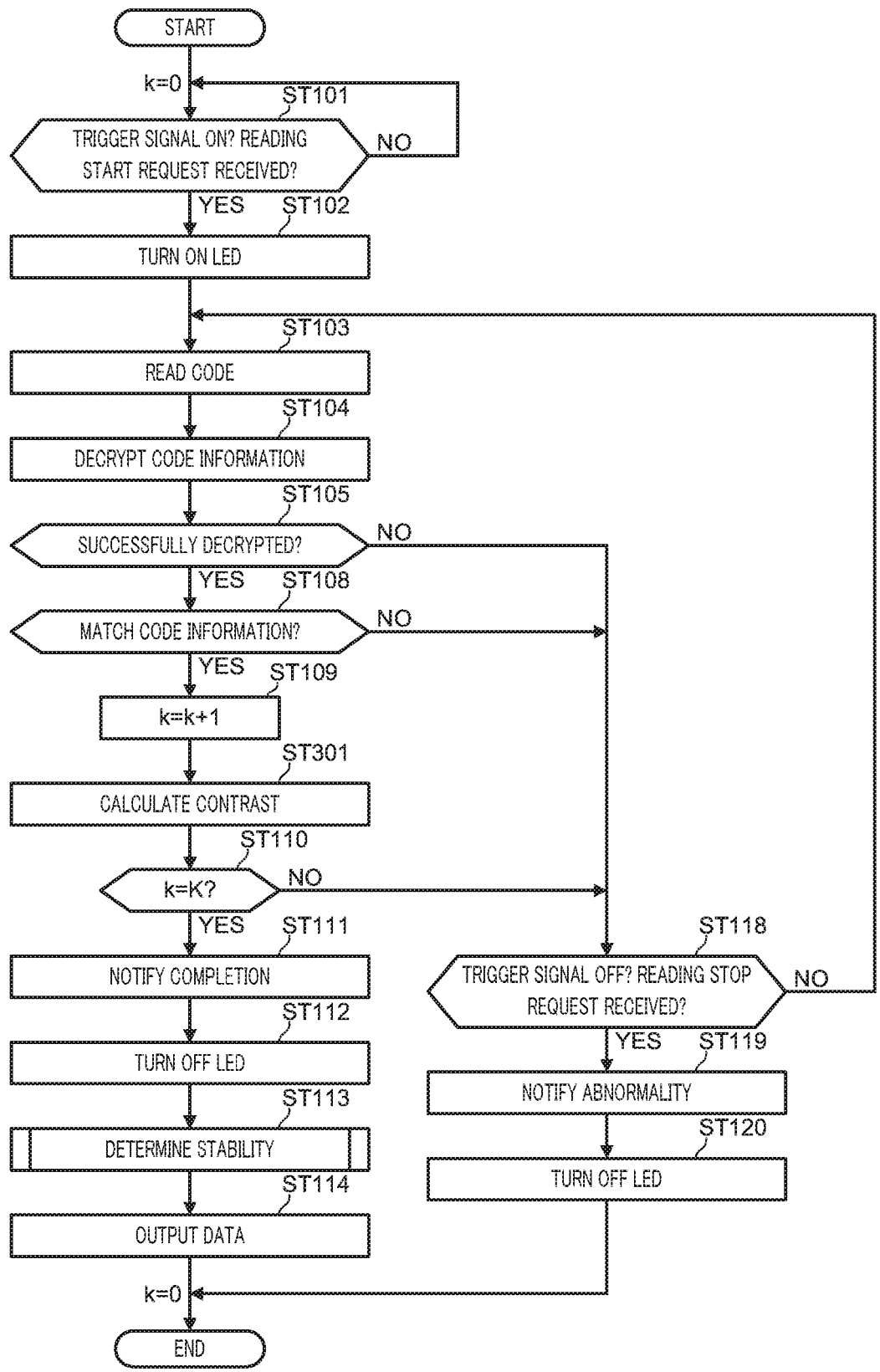
FIG. 7 is a flow diagram showing the flow of a process in a processor in the code scanner according to Embodiment 3 of the present invention.

The flow of a process in processor 122 in code scanner 100 of Embodiment 3 will be described with reference to FIG. 7. Note that in the flow shown in FIG. 7, steps common with the flow shown in FIG. 2 are denoted by the same reference numerals as the corresponding steps shown in FIG. 2, and their description will therefore be omitted. The flow shown in FIG. 7 is different from the flow shown in FIG. 2 in that ST 106, ST 107, ST 115, ST 116, and ST 117 are deleted and ST 301 is added between ST 109 and ST 110. Note that in Embodiment 3, in the initial state, the number of reading successes k is set to "0" for RAM 123. In addition, for RAM 123, reference value K for determination of reading success is set in advance.

When the decrypted code information matches the stored code information in ST 108 (ST 108: YES), processor 122 increments the number of reading successes k by "1" (ST 109) and calculates the contrast of the one-dimensional code (ST 301). Note that, in Embodiment 3, the contrast is defined as a difference between the luminance average before binarization of the white pixel area and the luminance average before binarization of the black pixel area.

After ST 301, processor 122 determines whether the number of reading successes k has reached determination reference value K (ST 110).

<Reading Stability Determining Process>

Figure 8:
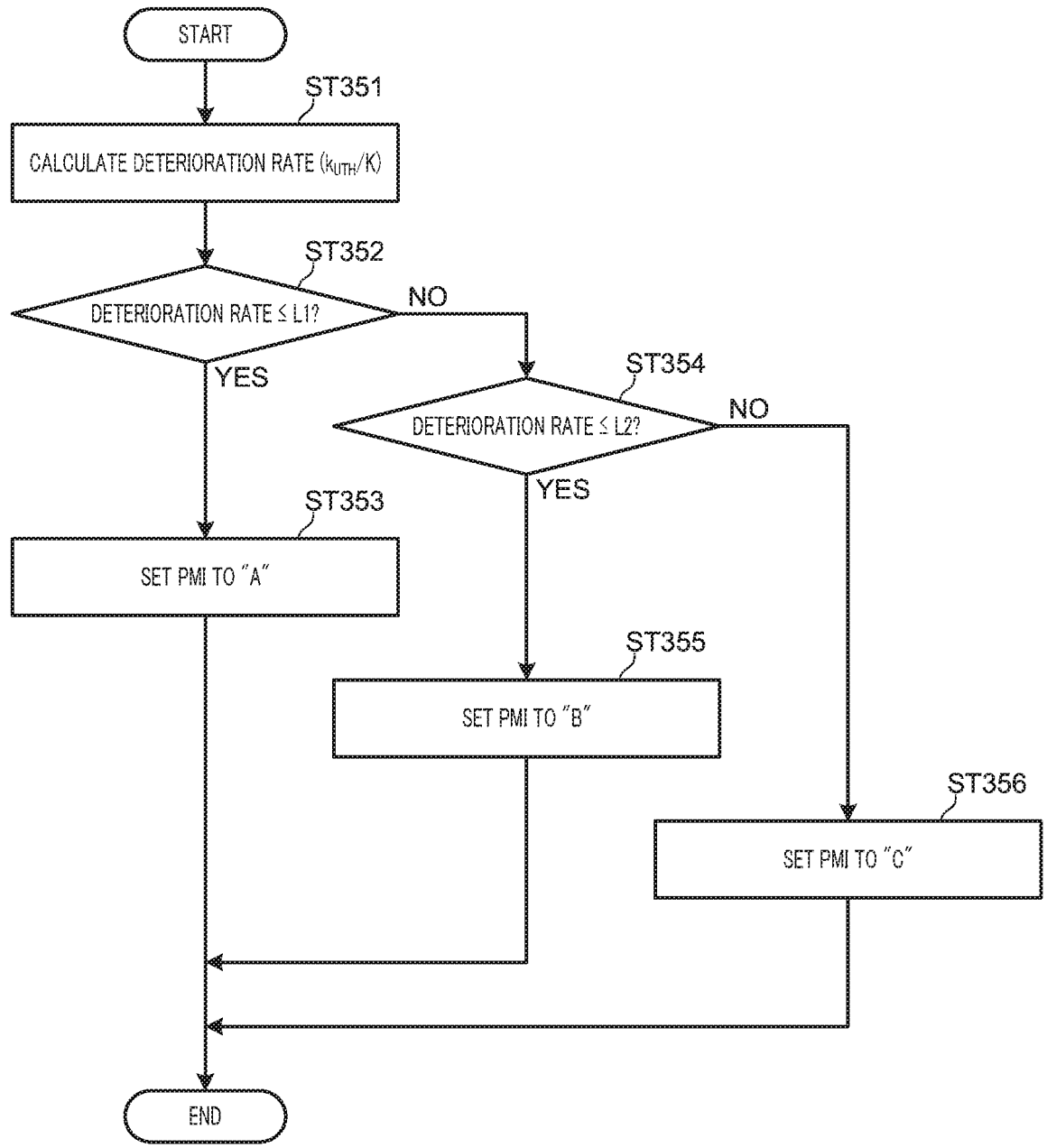
FIG. 8 is a flow diagram showing the flow of a reading stability determining process in the code scanner according to Embodiment 3 of the present invention.

Next, the details of the reading stability determining process of Embodiment 3 will be described with reference to FIG. 8. Note that in Embodiment 3, for RAM 123, caution threshold L1 and warning threshold L2 (L1<L2) are set in advance.

First, processor 122 calculates a deterioration rate ($k_{UTH}$/K) which is a ratio of the number of reading successes $k_{UTH}$ with a contrast that is less than or equal to a reference threshold to determination reference value K which is the total number of reading successes (ST 351).

Next, processor 122 compares the deterioration rate with caution threshold L1 and warning threshold L2 (ST 352 and ST 354).

When the deterioration rate is less than or equal to caution threshold L1 (ST 352: YES), processor 122 determines that the reading stability is at a normal level and sets the simplified character of PMI to "A" (ST 353). In contrast, when the deterioration rate is greater than caution threshold L1 (ST 352: NO) and less than or equal to warning threshold L2 (ST 354: YES), processor 122 determines that the reading stability is at a caution level and sets the simplified character of PMI to "B" (ST 355). When the deterioration rate is greater than warning threshold L2 (ST 354: NO), processor 122 determines that the reading stability is at a warning level and sets the simplified character of PMI to "C" (ST 356).

After determination related to reading stability, processor 122 outputs code information, which is a reading result related to one-dimensional code, and PMI, which is a determination result related to reading stability, to the processor of the vehicle.

Although the above description has been made assuming that PMI is a simplified character, this is not necessarily the case in Embodiment 3: for example, a deterioration rate ($k_{UTH}$/K) may be used as PMI. In this case, the necessity of the above-described process from ST 352 to ST 356 in FIG. 8 is eliminated.

Effects

As described above, in Embodiment 3, code scanner 100 determines reading stability based on the ratio of the number of reading successes with a contrast less than or equal to a reference threshold to the number of reading processes attempted during a period from the first reading success to the completion of the reading process. Thus, with one code scanner 100 attached to the vehicle, a process for reading one-dimensional code can be performed and a reading stability determining process can be performed for the one-dimensional code part used in the reading process. Hence, an optical code reading process and a reading stability determining process can be performed while suppressing an increase in the cost of the transfer system and avoiding a decrease in work efficiency.

Although a code scanner is used as an optical information reading apparatus in each embodiment, the present invention is applicable to the cases where other optical information reading apparatuses are used.

Figure 9:
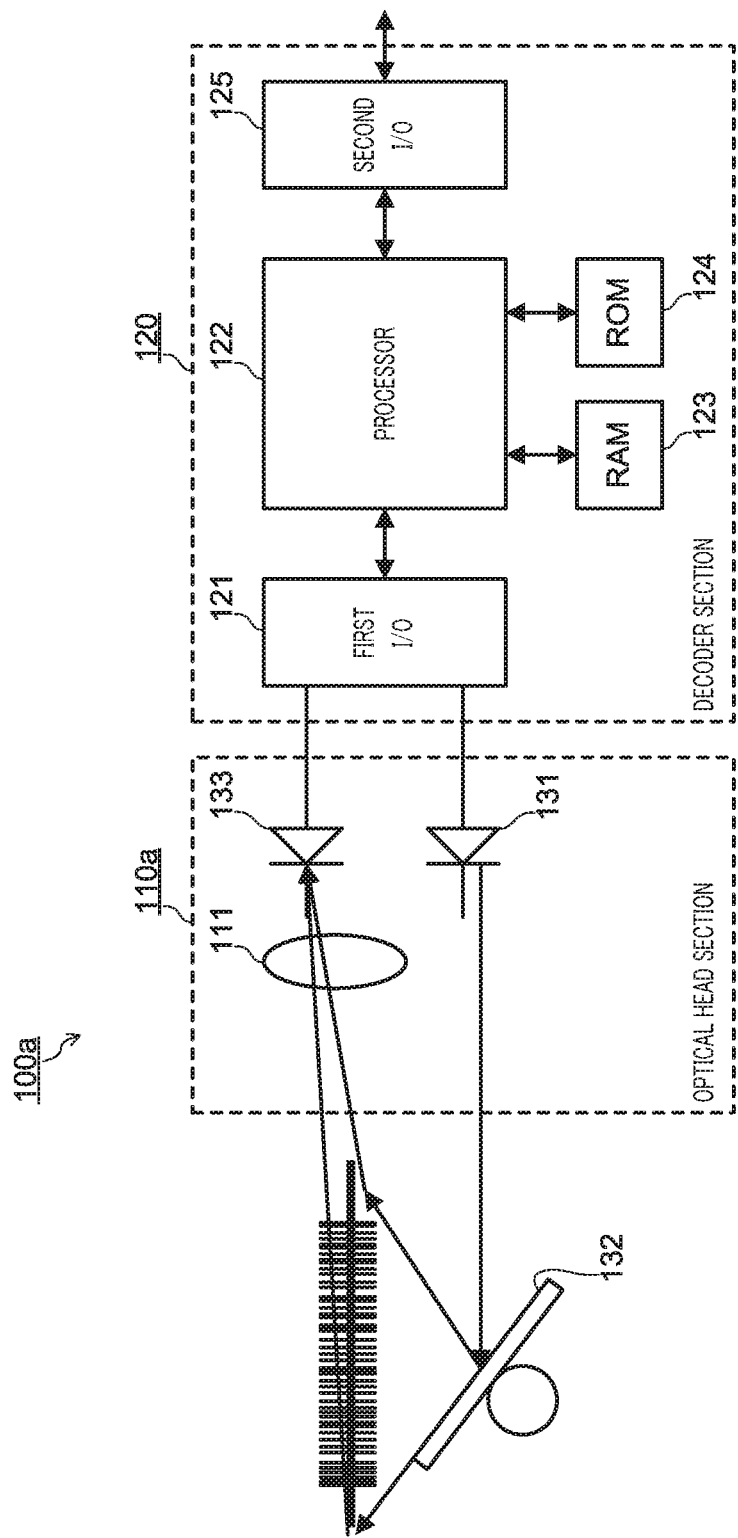
FIG. 9 is a diagram showing a schematic hardware configuration of a (laser) code scanner according to Embodiment 1 of the present invention.

In addition, as shown in FIG. 9, the present invention is also applicable to the case where laser code scanner 100*a* is used to read a one-dimensional code. Code scanner 100*a* shown in FIG. 9 is different from code scanner 100 shown in FIG. 1 in that laser diode 131 and photodiode 133 of optical head section 110*a* are additionally used instead of CCD 112 and LED 113 of optical head section 110 and a vibration mirror (or a polygon mirror) is additionally used. Laser diode 131 emits laser light. Vibration mirror 132 scans laser light. Photodiode 133 receives reflected light from the one-dimensional code taken by lens 111.

Further, although description has been made in the above-described embodiments assuming that reading stability is evaluated in three steps according to the magnitude relationship with two thresholds, this is not necessarily the case in the present invention: reading stability may be evaluated in two steps or four or more steps.

Further, in the above-described embodiments, the optical information reading apparatus may determine reading stability related to a plurality of optical codes, and when reading stability related to all the optical codes are decreased, determine that optical information reading apparatus itself has deteriorated, and transmit a signal for notifying warning to the host computer through the vehicle.

Further, in the above-described embodiments, the host computer may collect PMI from the optical information reading apparatus of each vehicle, and when a plurality of pieces of PMI for one optical code is at a caution level or warning level, determine that the optical code has deteriorated, and may issue a warning and notify the position of that optical code to the administrator.

Further, in the above-described embodiments, the host computer may collect a plurality of pieces of PMI for one optical code from the optical information reading apparatus of one vehicle, and when the percentage of caution level or warning level is greater than or equal to a predetermined value, determine that the optical code has deteriorated, and may issue a warning and notify the position of that optical code to the administrator.

INDUSTRIAL APPLICABILITY

The present invention is suitable for use in an optical information reading apparatus and an optical information reading method that perform an optical code reading process and a stability determination process.

REFERENCE SIGNS LIST

100, 100*a* Code scanner
110, 110*a* Optical head section

111 Lens
112 CCD
113 LED
120 Decoder section
121 First I/O
122 Processor
123 RAM
124 ROM
125 Second I/O

What is claimed is:

1. An optical information reading apparatus to be attached to a movable body that moves parallel to a height direction of a one-dimensional code, the optical information reading apparatus being configured to repeatedly attempt to read the one-dimensional code along movement of the movable body, the optical information reading apparatus comprising:
an imaging section that performs imaging; and
a control section that reads the one-dimensional code contained in image data taken by the imaging section, and outputs a signal upon completion of a reading process in which the number of reading successes related to the one-dimensional code reaches a determination reference value, wherein
the control section determines reading stability during a period from the first reading success to the completion of the reading process and outputs predictive maintenance information (PMI) representing a determination result of the reading stability.

2. The optical information reading apparatus according to claim 1, wherein the control section determines the reading stability based on a ratio of the number of reading successes or the number of reading failures to the number of reading processes attempted during the period from the first reading success to the completion of the reading process.

3. The optical information reading apparatus according to claim 1, wherein the control section determines the reading stability based on a ratio of the number of reading successes with a contrast of the one-dimensional code in the image data less than or equal to a reference threshold to the number of reading processes attempted during the period from the first reading success to the completion of the reading process.

4. An optical information reading apparatus to be attached to a movable body that moves parallel to a height direction of a one-dimensional code, the optical information reading apparatus being configured to repeatedly attempt to read the one-dimensional code along movement of the movable body, the optical information reading apparatus comprising:
an imaging section that performs imaging; and
a control section that reads the one-dimensional code contained in image data taken by the imaging section, and outputs a signal upon completion of a reading process in which the number of reading successes related to the one-dimensional code reaches a determination reference value, wherein
the control section determines reading stability based on a reading process result after the completion of the reading process and outputs predictive maintenance information (PMI) representing a determination result.

5. The optical information reading apparatus according to claim 4, wherein the control section determines the reading stability based on a ratio of the number of reading successes or the number of reading failures to the number of reading processes attempted during a predetermined period after the completion of the reading process.

6. The optical information reading apparatus according to claim 1, wherein the control section outputs the predictive maintenance information with code information that is a reading result of the one-dimensional code.

7. An optical information reading method for an optical information reading apparatus that is to be attached to a movable body moving parallel to a height direction of a one-dimensional code, the optical information reading method comprising:
- performing imaging in an imaging section;
- reading the one-dimensional code contained in image data taken by the imaging section;
- outputting a signal upon completion of a reading process in which the number of reading successes related to the one-dimensional code reaches a determination reference value;
- determining reading stability during a period from the first reading success to the completion of the reading process; and
- outputting predictive maintenance information (PMI) representing a determination result of the reading stability.

\* \* \* \* \*